US007051341B2

(12) United States Patent
Burton et al.

(10) Patent No.: US 7,051,341 B2
(45) Date of Patent: May 23, 2006

(54) METHOD, SYSTEM, AND PROGRAM FOR IMPLEMENTING A REMOTE METHOD CALL

(75) Inventors: David Alan Burton, Vail, AZ (US); Robert Louis Morton, Tucson, AZ (US); Gary William Steffens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 10/020,692

(22) Filed: Dec. 14, 2001

(65) Prior Publication Data

US 2003/0115379 A1 Jun. 19, 2003

(51) Int. Cl.
*G06F 9/44* (2006.01)

(52) U.S. Cl. .................. 719/330; 719/313; 719/316; 709/217

(58) Field of Classification Search ............... 719/315, 719/316, 330; 709/217–219
See application file for complete search history.

(56) References Cited

U.S. PATENT DOCUMENTS

| 5,511,197 | A | | 4/1996 | Hill et al. |
|---|---|---|---|---|
| 5,724,588 | A | | 3/1998 | Hill et al. |
| 5,793,965 | A | | 8/1998 | Vanderbilt et al. |
| 5,920,863 | A | | 7/1999 | McKeehan et al. |
| 6,006,230 | A | | 12/1999 | Ludwig et al. |
| 6,018,805 | A | | 1/2000 | Ma et al. |
| 6,125,402 | A | * | 9/2000 | Nagarajayya et al. ....... 719/330 |
| 6,134,603 | A | * | 10/2000 | Jones et al. .................. 719/330 |
| 6,158,010 | A | | 12/2000 | Moriconi et al. |
| 6,182,154 | B1 | | 1/2001 | Campagnoni et al. |
| 6,182,155 | B1 | | 1/2001 | Cheng et al. |
| 6,230,160 | B1 | | 5/2001 | Chan et al. |
| 6,253,253 | B1 | | 6/2001 | Mason et al. |
| 6,385,661 | B1 | * | 5/2002 | Guthrie et al. .............. 719/316 |
| 6,487,607 | B1 | * | 11/2002 | Wollrath et al. ............ 719/330 |
| 6,549,955 | B1 | * | 4/2003 | Guthrie et al. .............. 719/315 |
| 6,636,900 | B1 | * | 10/2003 | Abdelnur .................... 719/316 |
| 6,728,788 | B1 | * | 4/2004 | Ainsworth et al. ......... 719/330 |

FOREIGN PATENT DOCUMENTS

| EP | 940748 | 9/1999 |
|---|---|---|
| JP | 11085519 | 3/1999 |

OTHER PUBLICATIONS

Avvenuti et al. "Embedding remote object mobility in Java RMI" 2001 IEEE, pp. 1-6.*

(Continued)

*Primary Examiner*—William Thomson
*Assistant Examiner*—Van Hoa Nguyen
(74) *Attorney, Agent, or Firm*—David W. Victor; Konrad Raynes & Victor LLP

(57) ABSTRACT

Provided is a computer implemented method, system, and program for implementing for implementing a remote method call. Remote objects and at least one proxy object are generated, where each proxy object corresponds to one remote object. Data from the remote object is included into the proxy object. A call to a method on one proxy object is processed and the method is executed. The method is one of a plurality of methods, wherein at least one of the plurality of methods comprises a local method including code to perform method operations on the proxy object without going to the remote object and at least one other of the plurality of methods comprises a remote method including code to perform method operations on the remote object.

38 Claims, 7 Drawing Sheets

OTHER PUBLICATIONS

Orfali et al. "The essential Distributed objects survival guide" 1996, p. 69.*

Aldrich, Jonathan, James Dooley, Scott Mandelsohn, and Adam Rifkin. "Providing Easier Access to Remote Objects in Client-Server Systems", *Proceedings of the Thirty-First Hawaii International Conference on System Sciences,* vol. 7, pp. 366-375.

Banda, V.P., D. Bezviner, F.R. Campagnoni, M.H. Conner, E.E. Shepler and M.G. Smith. "Distributed Object Activation and Communication Protocols", *IBM Technical Disclosure Bulletin.* vol. 37, No. 7, Jul. 1994, pp. 539-542.

Deri, L. "Multidomain Network Management Using Common Object Request Broker Architecture", *IBM Technical Disclosure Bulletin.* vol. 40, No. 6, Jun. 1997, pp. 91-92.

Hagimont, Daniel and Fabienne Boyer. "A Configurable RMI Mechanism for Sharing Distributed Java Objects", *IEEE Internet Computing,* vol. 5, No. 1, Jan.-Feb. 2001, pp. 36-43.

IBM Corp. "Session Sharing in a Cluster of Java Servers", *Research Disclosure.* Feb. 2000, Disclosure No. 430142, p. 355.

Knapman, J.M. "Distributed Object Encapsulation of Customer Information Control System Distributed Transaction Processing", *IBM Technical Disclosure Bulletin.* vol. 38, No. 1, Jan. 1995, pp. 177-180.

U.S. Appl. No. 09/259,141, filed on Feb. 26, 1999, entitled "Process and System for a Client to Perform a Remote Method Invocation of a Method in a Server Object", invented by A.A. Apte.

Sun Microsystems, Inc., "Java Distributed Object Model", [online], © 1996, 1997 Sun Microsystems, Inc. [Retrieved on Dec. 2, 2001]. Retrieved from the Internet at <URL: http://java.sun.com/products/jdk/1.1/docs/guide/rmi/spec/rmi-objmodel.doc.htm>.

Sun Microsystems, Inc., "Java Remote Method Invocation-Distributed Computing for Java", [online], © 1995-2001 Sun Microsystems, Inc. [Retrieved on Dec. 2, 2001]. Retrieved from the Internet at <URL: http://javar.sun.com/marketing/collateral/javami.htm>.

Sun Microsystems, Inc., "Java Remote Method Invocation Specification- Java 2 SDK", © 2001 Sun Microsystems, Inc. Revision 1.7, Standard Edition, v1.4 Beta 2. pp. 1-112.

* cited by examiner

METHOD, SYSTEM, AND PROGRAM FOR IMPLEMENTING A REMOTE METHOD CALL

BACKGROUND OF THE INVENTION

1. Field of the Invention

The present invention relates to a method, system, and program for method, system, and program for implementing a remote method call in a network environment including a client and server systems.

2. Description of the Related Art

The Java** Remote Method Invocation (RMI) protocol and other communication protocols, such as the Simple Object Access Protocol (SOAP), provides a framework in which objects on separate computers may communicate over a network. In the Java RMI framework, an object on a server is represented on a client system by a stub or proxy object. Applications running on the clients can call remote interfaces on the stub object that has the same set of remote interfaces defined by the remote object class. The stub object carries out the method call on the remote object. When a stub method is invoked, the stub object initiates a connection with the remote Java Virtual Machine (JVM) containing the remote object and transmits the parameters to the remote JVM using RMI interfaces. The stub object then receives the result of the method invocation and returns the values to the caller.

In the prior art, the caller on the client must include code to handle RMI exceptions that the stub object receives from the remote object and passes to the caller. RMI exceptions include any exceptions resulting from communication problems between the stub and the remote object as well as certain errors in the operation of the remote object reported as RMI exceptions, such as a divide by zero that occurs during the execution of the method on the remote object on the server. This requirement that the calls to the proxy object include "guarding" code to handle the RMI specific exceptions increases software development costs because every caller that invokes methods on the stub object must be additionally coded to handle RMI exceptions.

Further, client-server applications that make frequent calls to the stub objects on the client that require communication with the server may generate significant network traffic that may adversely effect network performance. Further details of the RMI protocol are described in the publication "Java Remote Method Invocation Specification," Revision 1.7 (Copyright Sun Microsystems, Inc.

Applet programs also use the RMI framework. An applet is often launched from a server over the Internet and executes in a web browser program on the client. An applet can either be unsigned or signed. A signed applet is implemented in a Java archive (Jar) file having a signing certificate. When executing unsigned applets in the client, the RMI framework implemented in the client restricts the applet to only communicate with the server from which the applet was launched, and not any other servers. Thus, within the current RMI framework, unsigned applets can only communicate with the server from which the applet was downloaded and launched, and cannot communicate with any other servers or computers. Signed applets are allowed to communicate with servers other than the server from which they are downloaded and perform Input/Output (I/O) operations on the machine in which they are executing. To work within this programming constraint for unsigned applets, applet developers must assure that any data or code the unsigned applet may need to access from the server be maintained on the server from which the applet was downloaded, even if the server side architecture would be more optimally configured by having the needed data on different machines. One technique to work around this constraint is to include mechanisms in the server from which the applet was downloaded to access the data from another server. However, in all cases, the unsigned applet cannot interact with servers other than the server from which the applet was downloaded, even if such direct applet-to-server interaction would be the most efficient design.

Still further, if a developer incorporates the RMI framework into their programming environment, then migrating to a different communication protocol that may be more suitable than RMI would prove difficult because the developer would have to recode all the client callers that invoked methods on the RMI stub object to remove the RMI specific exception handling code from such callers and then incorporate any specific error exception handling code required by the new protocol. This process of having to recode all classes and callers that previously used the RMI framework and called the RMI stub file could substantially increase the cost and time commitment needed to switch to a different client-server communication protocol.

For all the above reasons, there is a need in the art for an improved framework and architecture to allow applications on a client to execute method on objects in remote systems.

SUMMARY OF THE DESCRIBED IMPLEMENTATIONS

Provided is a computer implemented method, system, and program for implementing for implementing a remote method call. Remote objects and at least one proxy object are generated, where each proxy object corresponds to one remote object. Data from the remote object is included into the proxy object. A call to a method on one proxy object is processed and the method is executed. The method is one of a plurality of methods, wherein at least one of the plurality of methods comprises a local method including code to perform method operations on the proxy object without going to the remote object and at least one other of the plurality of methods comprises a remote method including code to perform method operations on the remote object.

In further implementations, executing one local method comprises processing data in the proxy object from the remote object, wherein remote object data is returned to the caller from the proxy object.

In still further implementations, a client communication object and a server communication object are generated, wherein the client and server communication objects enable communication therebetween.

Yet further, each client communication object is instantiated from a client communication class and each server communication object is instantiated from a server communication class. In such case, the client and server communication classes implement methods from a communication protocol class.

Yet further, the client communication class includes code to handle error exceptions generated from the communication protocol class in response to executing remote methods on the plurality of proxy objects.

Additionally, the server communication object comprises a first server communication object and the called method comprises a remote method. The client communication object transmits information indicating the called remote method and remote object corresponding to the proxy object subject on which the remote method is called. The first server communication object receives the information indicating the remote method and remote object to execute. The first server communication object further determines whether the indicated remote object is on a second server communication object and transmits information on the indicated remote method and remote object to a second server communication object for execution thereon if the indicated remote object for execution on the second server communication object.

Further implementations provide a method, system, and program for accessing data from remote objects. At least one proxy object is received, where each proxy object corresponds to one remote object, and wherein the proxy object includes data from the remote object. A call to a method on one proxy object is processed. The method is executed. The method is one of a plurality of methods, wherein at least one of the plurality of methods comprises a local method including code to perform method operations on the proxy object without going to the remote object and at least one other of the plurality of methods comprises a remote method including code to perform method operations on the remote object.

The described implementations thus provide techniques for implementing a remote method call in a client server environment that allow for certain information from remote objects to be maintained and accessed locally on the client. Further implementations, provide for locating communication protocol operations in objects separate from the proxy objects so that one communication object handles all communication related operations for multiple proxy objects.

BRIEF DESCRIPTION OF THE DRAWINGS

Referring now to the drawings in which like reference numbers represent corresponding parts throughout.

DETAILED DESCRIPTION OF THE
PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
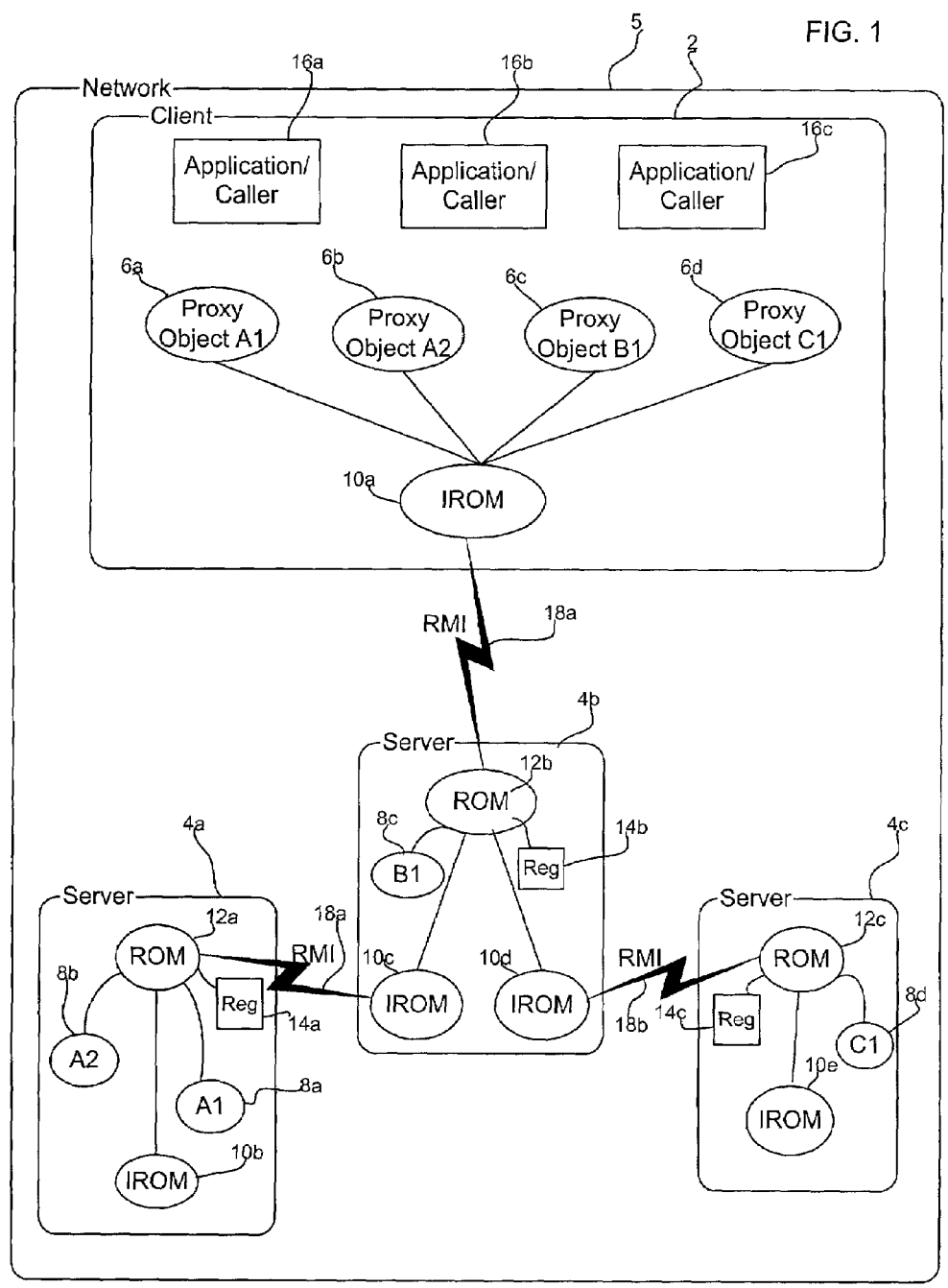
FIG. 1 illustrates a network environment in which aspects of the invention are implemented.

FIG. 1 illustrates a computing environment in which aspects of the invention are implemented. A client system 2 and servers 4a, 4b, and 4c communicate over a network 5, which may comprise any network known in the art, e.g., a Local Area Network (LAN), Wide Area Network (WAN), Storage Area Network (SAN), the Internet, an Intranet, etc. The client 2 includes a plurality of proxy objects 6a, 6b, 6c, 6d instantiated for remote objects 8a, 8b, 8c, and 8d, respectively, on the servers 4a, 4b, 4c. The client 2 and the servers 4a, 4b, and 4c each include an Interface Remote Object Manager (IROM) 10a, 10b, 10c, 10d, 10e and the servers 4a, 4b, and 4c further include Remote Object Managers (ROMs) 12a, 12b, and 12c. Each ROM 12a, 12b, and 12c maintains a registry 14a, 14b, and 14c including for each remote object instance subclass, the unique identifier of the remote object subclass instance and a pointer to the instance of the remote object subclass in the server 4a, 4b, 4c. In actual implementations, any number of client and server machines including IROMs and ROMs may be included in the environment. Each device would include a unique instance of one IROM 10a . . . 10e for each server to which the device communicates to enable communication with the ROM 12a, 12b, 12c in that device. For instance, server 4b includes one IROM 10c instance to enable communication with ROM 12a in server 4a and IROM 10d instance to enable communication with ROM 12c in server 4c. The communication links 18a, 18b, and 18c illustrate a communication operation, such as an RMI communication, that is enabled through the ROMs 12a, 12b, 12c and IROMs 10a . . . 10e.

In the described implementations, application/callers 16a, 16b, and 16c comprise an application or process in the client 2 that invokes methods on a remote object 8a, 8b, 8c, and 8d. The application/callers 16a, 16b, and 16c can comprise applets downloaded from over one of the servers 4a, 4b, 4c, or any other application or process known in the art. To accomplish the remote invocation, the application/callers 16a, 16b, and 16c would invoke the methods upon the local proxy object 6a, 6b, 6c, 6d representing the targeted remote object 8a, 8b, 8c, 8d. The called proxy object 6a, 6b, 6c, and 6d would, in turn, pass the method call to the IROM 10a, which handle the communication with the ROM 12b and passes the invoked method to the ROM 12b to invoke the method on the target remote object 8a, 8b, 8c, 8d if the target remote object is located on the server 4b or forward the method through the IROM 10c on the receiving server 4b to the ROM 12a or 12c of the server including the target remote object 8a, 8b and 8d. In certain implementations, the IROM 10a, 10b, 10c, 10d, 10e and the ROM 12a, 12b, 12c are instantiated from classes that are subclasses of the specific communication protocol classes that implement the communication, such as the RMI classes required to implement the RMI protocol.

Figure 2:
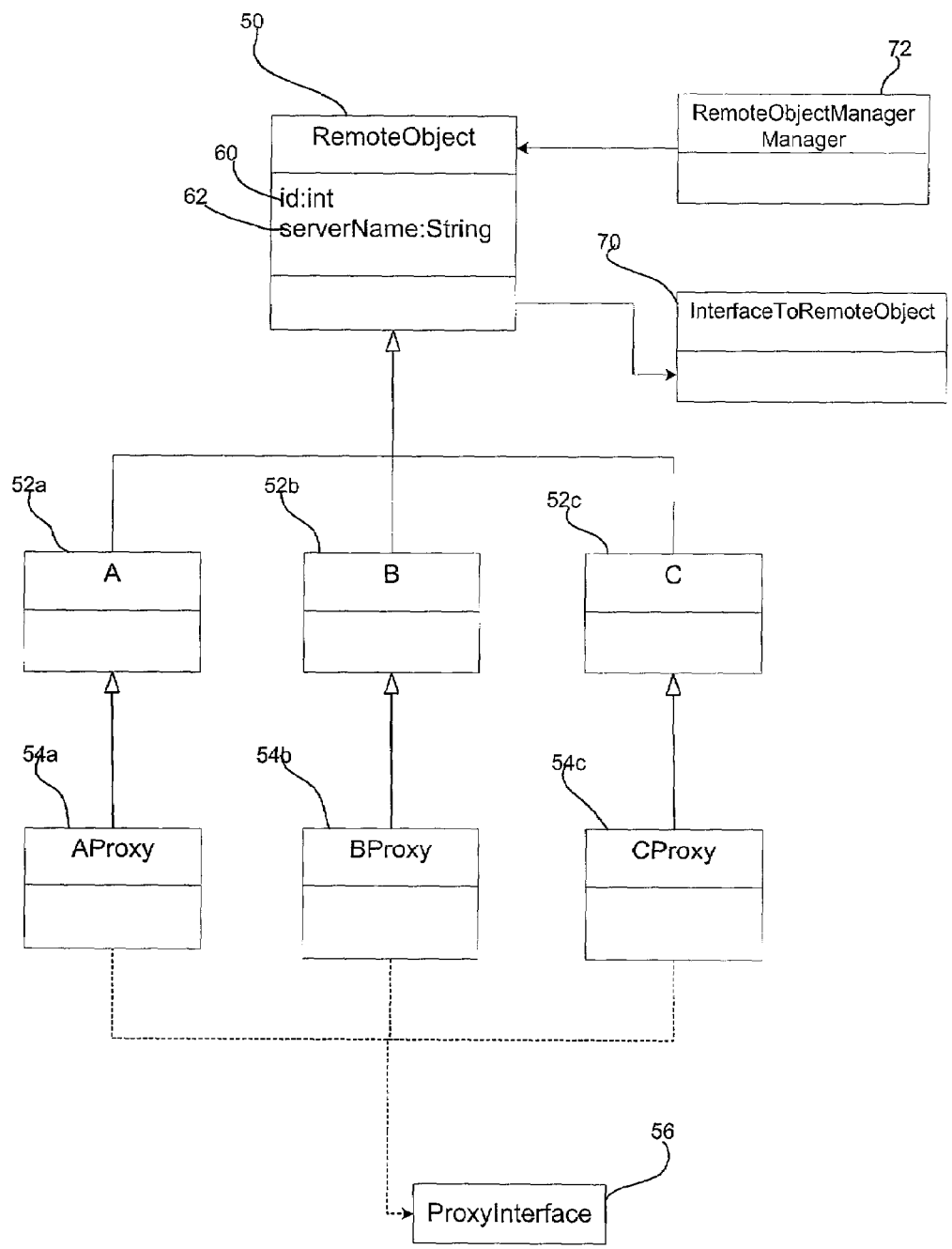
FIG. 2 illustrates a class schema in accordance with implementations of the invention.

The remote objects 8a, 8b, 8c, and 8d are objects instantiated from classes implemented in one of the servers 4a, 4b, and 4c. For instance, the A1 and A2 objects 8a, 8b are separate objects instantiated from the same class A. FIG. 2 illustrates a class schema of the classes in accordance with implementations of the invention. A RemoteObject class 50 is a superclass including methods that are inherited by other classes participating in the architecture. FIG. 2 shows remote object classes A, B, and C (52a, 52b, and 52c) as subclasses of the RemoteObject class 50. The classes A, B, C would include additional class specific methods to perform the functions defined for the class with respect to the remote objects 8a, 8b, 8c, 8d. The schema further includes proxy object subclasses 54a, 54b, and 54c that implement the proxy class for each of the remote classes 52a, 52b, and 52c. The proxy object subclasses 54a, 54b, 54c further implement the ProxyInterface class 56, which includes a method (the initializeProxy( ) method discussed below) that is used to create and initialize a proxy object. In this way, the proxy object subclasses 54a, 54b, and 54c inherit all the interfaces and methods of the RemoteObject class 50 and the classes 52a, 52b, and 52c from which the remote objects are instantiated. Each subclass may provide a specific implementation of the methods inherited from the RemoteObject superclass 50.

The RemoteObject class 50 provides attributes and interfaces that must be implemented by remote objects 8a, 8b, 8c,

8d and proxy objects 6a, 6b, 6c, 6d to ensure that newly created instances of remote objects 8a, 8b, 8c, 8d are properly registered in the ROM 12a, 12b, 12c registries 14a, 14b, 14c and have a valid ID used to identify the remote objects 8a, 8b, 8c, 8d in the registries 14a, 14b, 14c. The subclasses 52a, 52b, and 52c may use their own generation scheme and have their own implementation of the methods of the RemoteObject class 50.

The InterfaceToRemoteObject class 70 provides methods and interfaces to create the IROMs 10a, 10b, 10c, 10d, 10e to enable the client 2 to communicate with the server 4b. The IROM object 10a, 10b, 10c, 10d, 10e is responsible for conveying the request to invoke a method against a remote object to the ROM 12a, 12b, 12c including the remote object 8a, 8b, 8c, 8d; creating or retrieving a proxy object for a specified remote object 8a, 8b, 8c, 8d; and managing several instances of the IROM on a single client, where each instance enables communication with a different ROM 12a, 12b, 12c at a specified remote location, e.g., server 4a, 4b, 4c. The InterfaceToRemoteObject class 70 may implement the following methods:

createProxyForRemoteObject( ): includes code to create and return a proxy for the remote object 8a, 8b, 8c, 8d. This method is called with the parameters of the remote location of the server including the targeted remote object 8a, 8b, 8c, 8d and the identifier of the remote object, as well as the class from which the remote object 8a, 8b, 8c, 8d is instantiated.

establishSingleConnection( ): includes code to create an instance of the IROM 10a, 10b, 10c, 10d, 10e object to enable a connection with one ROM 12a, 12b, and 12c at one specified with remote location. One instance of the IROM on a machine 2, 4a, 4b, 4c is instantiated to communicate with the ROM at a specific remote location. The remote location information in the serverName attribute of a proxy object 6a, 6b, 6c, 6d is used to route the proxy's call from IROM 10a to ROM 12b, then to either ROM 12a or 12c.

invokeOnRemoteCounterpart( ): called with the proxy class name and the remote method name, ID 60, server name 62, and any parameters that are provided with the remote method call. This method is called by the proxy object subclass when the method called against the proxy object is a remote method to be executed remotely at the server including the remote object.

In current Java applet implementations, an unsigned applet is restricted to only communicate with a single specified remote location. However, with the described implementations, if the application/caller 16a, 16b, 16c comprises an unsigned applet requesting a remote object that is not on the server from which the applet was launched, then the IROM 10a on the server 4b from which the applet was launched would forward the request toward the ROM 12b, which in turn forwards the request to IROM 10c or 10d, which in turn forwards the request to ROM 12a or 12c on a different server 4a, 4c that includes the targeted remote object. Unsigned applets can only communicate with the server that launched them. In alternative implementation, the application/caller 16a, 16b, 16c may comprise a signed applet.

The RemoteObjectManager class 72 provides methods and interfaces to create the ROMs 12a, 12b, 12c; register remote objects 8a, 8b, 8c, 8d in the registries 14a, 14b, 14c; invoke methods on registered object 8a, 8b, 8c, 8d in response to requests from a client; de-register a remote object 8a, 8b, 8c, 8d; create a proxy object 6a, 6b, 6c, 6d for a remote object 8a, 8b, 8c, 8d; and forward a method invocation request to another remote location through the IROM 10b, 10c, 10d, 10e on the server including the ROM 12a, 12b, 12c. Following are some methods that may be implemented in the RemoteObjectManager class 72:

assignObjectID( ) includes code to create and assign a new, unique object identifier (ID) to the created object.

addToRegistry( ): includes code to add a new object specified as a parameter to the registry 14a, 14b, 14c.

removeFromRegistry( ): includes code to remove an object specified as a parameter to the registry 14a, 14b, 14c.

createProxyForRemoteObject( ): includes code to create and return a proxy for the remote object 8a, 8b, 8c, 8d. This method is called with the parameters of the remote location of the server including the targeted remote object 8a, 8b, 8c, 8d and the identifier of the remote object, as well as the class from which the remote object 8a, 8b, 8c, 8d is instantiated.

invokeOnRegisteredObject( ): includes code to invoke a specified remote method against a remote object 8a, 8b, 8c, 8d having a unique identifier on a server.

Further, the ROMs 12a, 12b, and 12c calls the initializeProxy( ) method when creating a proxy object 6a, 6b, 6c, 6d for a specified remote object subclass 52a, 52b, 52c. The implementation of the initializeProxy( ) for a specific subclass may define particular data to copy from the remote object 8a, 8b, 8c, 8d into the proxy object 6a, 6b, 6c, 6d. This will allow for certain methods of the class to be serviced from the data maintained in the local proxy object 6a, 6b, 6c, 6d without having to transfer the method to the server 4a, 4b, 4c to invoke remotely. In this way, the proxy objects 6a, 6b, 6c, 6d are extended to include specific data from the remote objects 8a, 8b, 8c, 8d available for local access. This feature of the described implementations reduces network traffic, and hence improves network performance, by reducing the number of transactions over the network through servicing invoked methods locally from the data included in the proxy objects 6a, 6b, 6c, 6d.

Figure 3A:
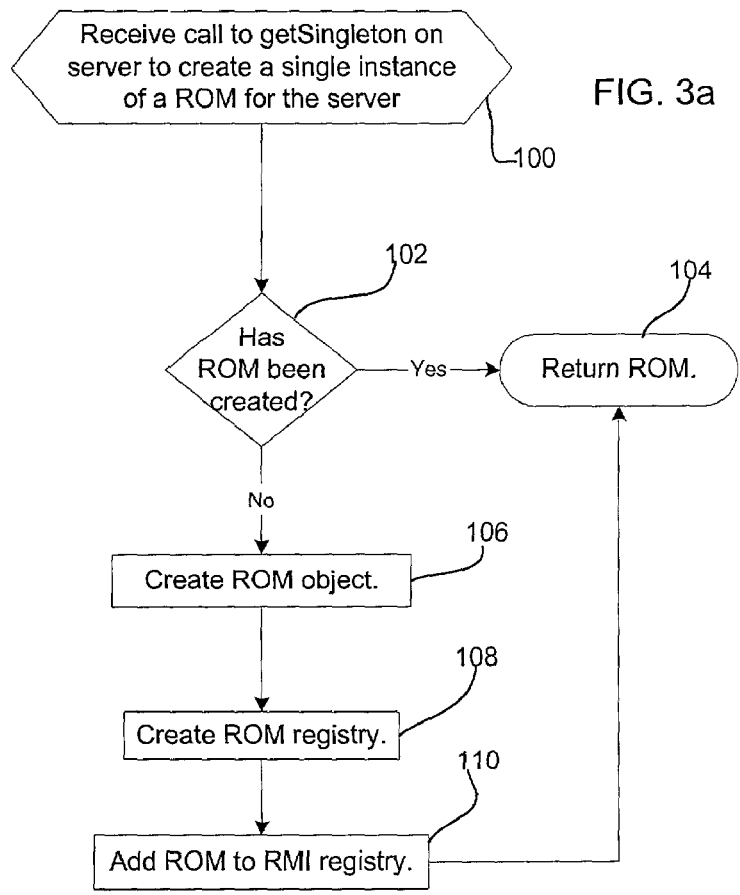
FIGS. 3a, 3b, 4, and 5 illustrate logic to instantiate objects used in client server communication implemented in accordance with implementations of the invention.

FIGS. 3a, b and 4–7 illustrate logic implemented by the methods in the above described classes to execute methods called on proxy objects in a client-server architecture. FIG. 3a illustrates logic implemented in the methods of the RemoteObjectManager class 72 to instantiate a singleton instance of the ROM 12a, 12b, 12c on the server 4a, 4b, 4c to manage remote calls. Control begins at block 100 upon receiving a call to getSingleton independently on each server 4a, 4b, 4c, which is a method of the RemoteObjectManager class 72, to create a single instance of the Rom 12a, 12b, 12c on the server 4a, 4b, 4c from which the call is made. If (at block 102) there is already a ROM 12a, 12b, 12c on the server, then the ROM 12a, 12b, 12c is returned (at block 104). Otherwise, if there is no registered ROM, then a method would be called (at block 106) to create the ROM object and create (at block 108) the ROM registry 14a, 14b, 14c. The ROM object is then added (at block 110) to the RMI registry of the server 4a, 4b, 4c on which the ROM was created. In alternative non-RMI implementations, other registration techniques may be used.

Figure 3B:
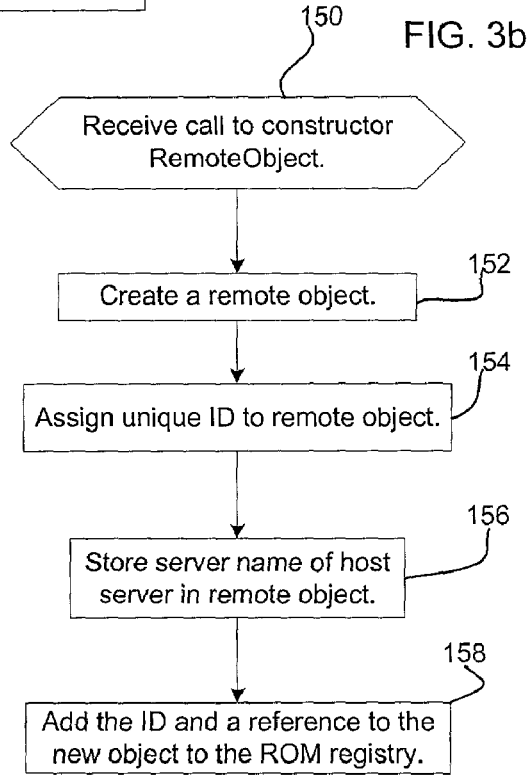

After a singleton instance of the ROM 12a, 12b, 12c is instantiated on the server 4a, 4b, 4c, then remote objects 8a, 8b, 8c, 8d may be instantiated to enable calls from remote clients. FIG. 3b illustrates logic implemented in the RemoteObject( ) constructor of the RemoteObject class 50, which is implemented in the remote object subclasses 52a, 52b, 52c and used to instantiate a remote object 8a, 8b, 8c, 8d. At block 150, a call is made on the server 4a, 4b, 4c to the constructor RemoteObject( ) for one remote object subclass 52a, 52b, 52c and a remote object 8a, 8b, 8c, 8d for the subclass 52a, 52b, 52c is created (at block 152). A unique identifier (ID) is assigned (at block 154) the created remote object and the server name of the host server is stored (at block 156) in the created remote object. An ID and a reference to the new object are added (at block 158) to the registry 14a, 14b, 14c.

The result of executing methods implementing the logic of FIGS. 3a and 3b is a ROM 12a, 12b, 12c and instantiated remote objects available on the server 4a, 4b, 4c and capable of receiving calls initiated at a remote client.

Figure 4:
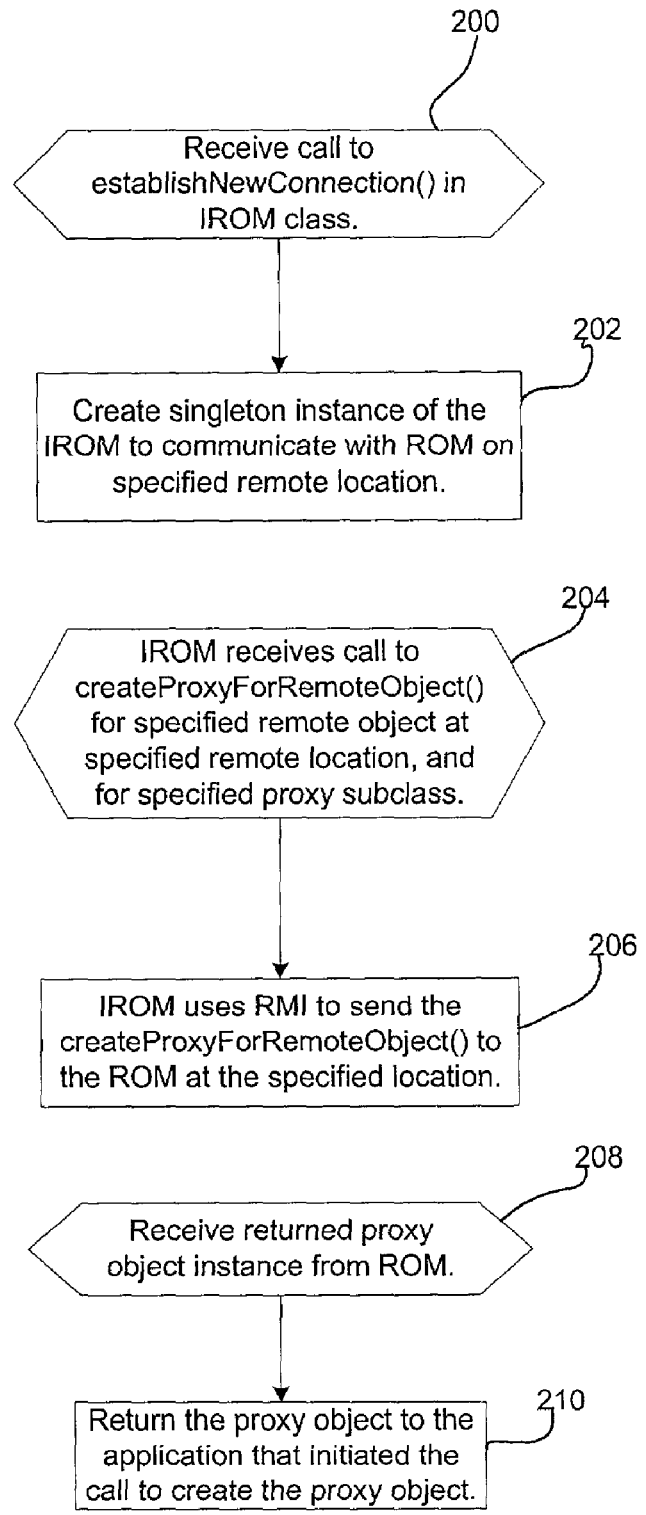

FIG. 4 illustrates logic implemented in the methods of the InterfaceToRemote Object 70 class to instantiate and use the IROM 10a, 10b, 10c, 10d. At block 200, a call to the establishNewConnection( ) is made to instantiate a IROM for a specified remote location (e.g., server 4a, 4b, 4c). In response, a singleton instance of the IROM 10a is created for the specified remote location. In this way, any system in the framework may access one IROM 10a to communicate with a particular remote location.

After instantiating the IROM 10a, application/callers 16a, 16b, 16c may then perform actions with respect to proxy objects. At block 204, a call to the createProxyForRemoteObject( ) is received for a specified proxy object instantiated with the name of the proxy subclass 54a, 54b, 54c. In response, the IROM object 10a uses the RMI protocol to transmit (at block 206) the createProxyForRemoteObject( ) method along with the parameters to the ROM 12b at the specified remote location. At block 208, the IROM object 10a receives the returned proxy object 6a, 6b, 6c, 6d in response to the transmitted call to the createProxyForRemoteObject( ). The IROM 10a then returns (at block 210) the received proxy object 6a, 6b, 6c, 6d to the caller 16a, 16b, 16c that initiated the call to create the proxy object. Once returned the application/callers 16a, 16b, 16c can call methods on the proxy object 6a, 6b, 6c, 6d when intending to perform methods on the corresponding remote object 8a, 8b, 8c, 8d on a remote server 4a, 4b, 4c.

Figure 5:
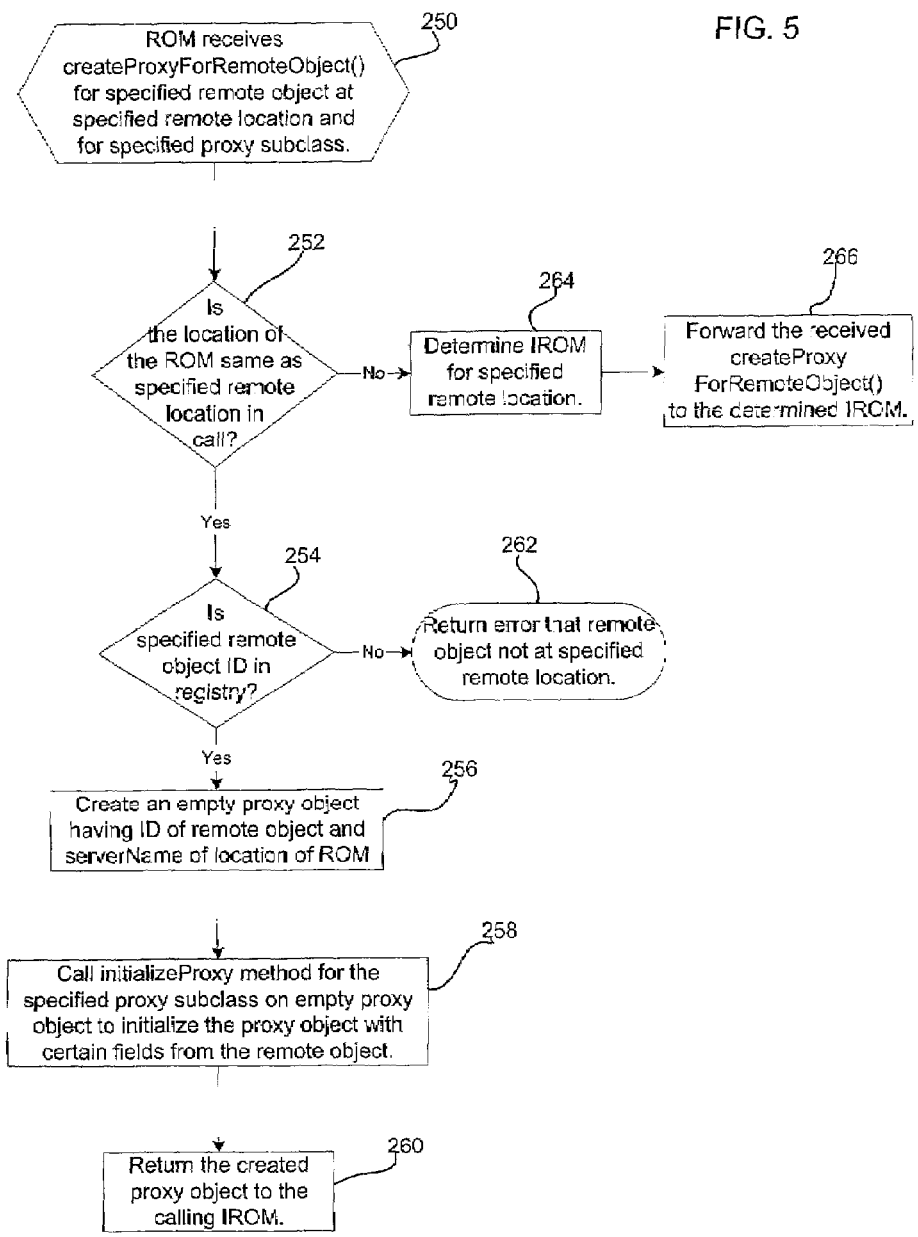

FIG. 5 illustrates logic implemented in the methods of the RemoteObject Manager 72 class to handle a call (at block 250) to the createProxyForRemote Object( ), having a specified remote object name at a specified remote location and specified proxy subclass 54a, 54b, 54n. If (at block 252) the location of the receiving ROM is the same as the location specified in the call and if (at block 254) the remote object ID specified in the call is listed in the registry 14b, then the ROM 12b creates (at block 258) an empty proxy object having the ID of the remote object indicated in the call and the serverName of the remote location specified in the call. The ROM 12b further calls (at block 260) the initializeProxy( ) method for the proxy subclass 54a, 54b, 54c specified in the call as a parameter. The initializeProxy( ) method includes code to initialize the created proxy object 6a, 6b, 6c, 6d with data from the remote object 8a, 8b, 8c, 8d the proxy represents. Each proxy subclass 54a, 54b, 54c may include different implementations of the initializeProxy( ) method. Further, the initializeProxy( ) method may add data from certain fields in the actual remote object 8a, 8b, 8c, 8d into the proxy object 6a, 6b, 6c, 6d to enable access of that data from the proxy object 6a, 6b, 6c, 6d on the client 2. In this way, methods called on the proxy object 6a, 6b, 6c, 6d on the client may access data from the proxy object in order to avoid the need to make a remote call over the network to perform on the remote object. Network traffic is reduced and network performance enhanced by performing certain calls locally instead of remotely. Developers may fine tune the initializeProxy( ) method to determine an optimal number of fields to include in the proxy object to avoid remote calls over the network and the servicing of methods from the data in the proxy object 6a, 6b, 6c, 6d.

After the proxy object 6a, 6b, 6c, 6d is created, the ROM 12b returns the proxy object to the IROM 10a that transmitted the call to create the proxy object. If (at block 254) there is no entry in the registry 14b for the remote object specified in the createProxyForRemoteObject( ) call, then the ROM 12b returns (at block 262) an error to the IROM 10a that the remote object specified in the create proxy call does not exist on the server 4a, 4b, 4c. If (at block 252) the location of the ROM 10a receiving the create proxy call is not the same as the remote location parameter in the call, then the receiving ROM 12b determines (at block 264) the IROM 10b or 10d instantiated for communication with the specified remote location. The receiving ROM 10a then forwards (at block 266) the call to the determined IROM 10b or 10d on a different sever 4a, 4c to which the createProxyForRemoteObject( ) method is directed. The ROM 12a or 12c upon receiving the forwarded call would then proceed to block 250 in FIG. 5 to process the call. This forwarding of remote calls allows an applet downloaded from one server, e.g., server 4b, to communicate or perform remote calls on remote objects in other servers, e.g., servers 4a and 4c. Although the current applet framework only allows communication communicates directly with one server 4b (the server from which the applet was launched), the applet may invoke calls on remote objects on other servers because the ROM 12b in the launching server 4b would forward the call to create the proxy object to the other server 4a or 4c.

Figure 6:
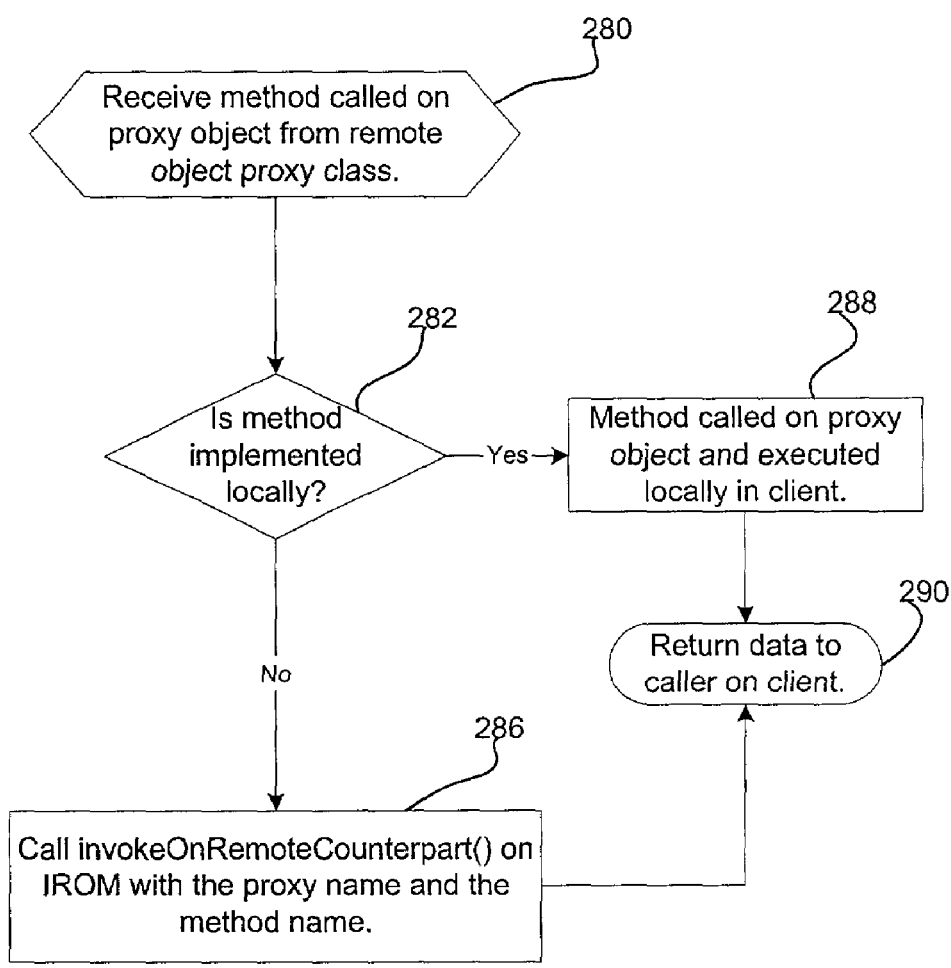
FIGS. 6, 7, and 8 illustrate logic to execute a method called on a proxy object representing a remote object on a server in accordance with implementations of the invention.

FIG. 6 illustrates logic implemented in the methods of the proxy subclasses 54a, 54b, 54c to handle calls made against the proxy objects 6a, 6b, 6c, 6d. Control begins at block 280 upon receiving a call to a method in the proxy object subclass 54a, 54b, 54c on the proxy object. As discussed, the proxy subclasses 54a, 54b, 54c are subclasses of the remote method classes 52a, 52b, 52c and would implement the methods of the remote method classes 52a, 52b, 52c with the logic of FIG. 6 to allow for execution of the method locally on the proxy object 6a, 6b, 6c, 6d or remotely on the remote object 8a, 8b, 8c, 8d. If (at block 282) the method is coded for remote execution, then the invokeOnRemoteCounterpart( ) method call is made (at block 286) to the IROM 10a with the proxy object name and the method name, and any method parameters. If (at block 282) the method is implemented locally, then the method is called (at block 288) on the proxy object and executed locally on the client 2. The data is then returned (at block 290) the application/caller 16a, 16b, 16c on the client 2.

Figure 7:
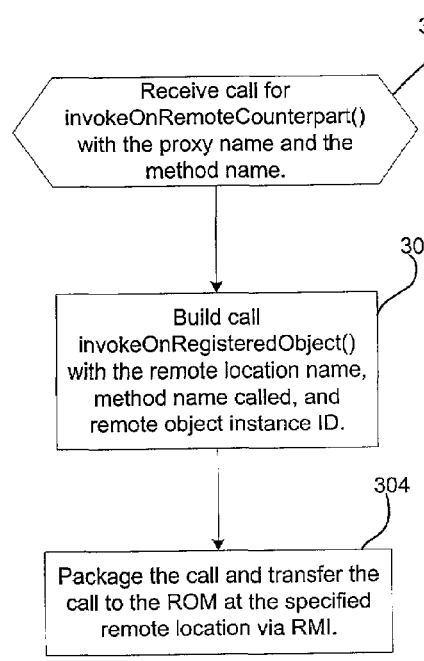

FIG. 7 illustrates logic implemented in the invokeOnRemoteCounterpart( ) method of the InterfaceToRemoteObject class 70. Control begins at block 300 with one IROM 10a receiving a call to the invokeOnRemoteCounterpart( ) with a specified remote location, remote object ID, and proxy object class 54a, 54b, 54c. In response, the called IROM 10a builds (at block 302) a call to the invokeOnRegisteredObject( ) method of the RemoteObjectManager class 72 with the remote location name, method name called, and ID of the remote object instance. This constructed call is then packaged and methods from the RMI class, or any other communication protocol class, that the IROM inherits, are called (at block 304) to transfer the invokeOnRegisteredObject( ) to the ROM 12b at the server, e.g. sever 4b, that launched the applet.

Figure 8:
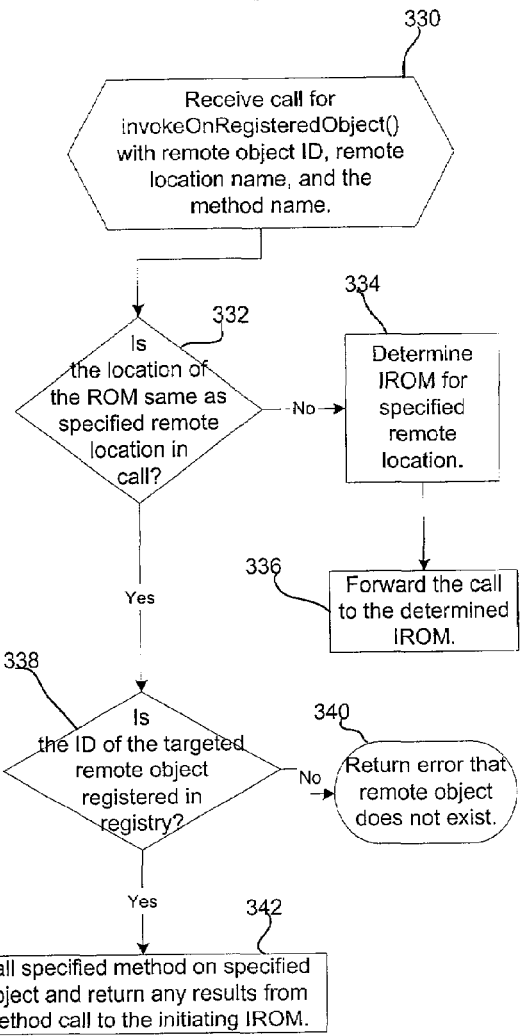

FIG. 8 illustrates logic implemented in the invokeOnRegisteredObject( ) method to handle the remote call at the remote location. Control begins (at block 330) with the ROM 12a receiving the call to the invokeOnRegisteredObject( ) method with the remote object ID, remote location name, and method name. If (at block 332) the location of the receiving ROM 12a is not the same as the remote location specified in the call, then the receiving ROM 12a determines (at block 334) the IROM 10c for the specified remote location and forwards (at block 336) the call to the determined IROM 10c to, in turn, forward (at block 336) the call to the ROM 10b or 10d at the specified server 4a or 4c (remote location). Again this feature allows an unsigned applet, which is restricted to only communicating with the server from which the applet was launched, from making a call to an object on a different server. If (at block 338) the ID of the targeted remote object is not listed in the registry 14b of the receiving ROM 12b, then an error is returned (at block 340) to the calling IROM 10a indicating that the specified remote object does not exist at the specified remote location 4b. If the ID of the targeted remote object 8c is in fact listed in the registry 14b, then the ROM 12b invokes (at block 342) the method specified in the call on the specified remote object 10c and returns any results, if any, from the method call to the initiating IROM 10a. In Java implementations, the ROM 12b may use Java reflection to construct the method call against the remote object 10c from the method name specified in the invokeOnRegisteredObject( ) call.

With the described class architecture for implementing remote calls, all the communication protocol specific methods, e.g., the RMI classes, are performed by the IROM and ROM objects at a level separate from the actual proxy and remote objects. The IROM class would further include RMI specific exception handling methods to handle any errors returned by the ROM when executing the remote call. The proxy subclasses 54a, 54b, 54c thus do not have to implement the communication protocol, e.g., RMI, specific classes because all communication and exception handling is performed by the IROM object. In this way, a developer may change the communication protocol, e.g., SOAP, used by altering the RemoteObject Manager 72 and InterfaceToRemoteObject 70 classes to implement the methods of the new communication protocol. The proxy objects and remote objects do not have to be altered because any communication protocol related operations are handled at the ROM/IROM level. Thus, remote objects and proxy objects may be reused in an alternative communication protocol environment.

With the described implementations, the proxy objects may include the data for the attributes of the remote object. This allows certain remote object subclass 52a, 52b, 52c methods to be executed locally on the client 2 because the attributes manipulated and returned by the method calls are maintained locally in the local proxy object 6a, 6b, 6c, 6d. Allowing for certain methods to be executed locally, reduces network traffic and improves network bandwidth by avoiding network traffic related to a remote call.

Additional Implementation Details

The above described method, apparatus or article of manufacture for implementing a client-server object may be implemented using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, certain operations were describe as performed in specific classes within the architecture. Certain of the operations may be implemented in methods of other of the described classes. Additional classes may be provided and the methods and operation described herein may be performed in such additional classes. The classes described herein may include additional methods to implement the remote call architecture. Further, the described remote object and proxy subclasses may include application specific methods to perform specific tasks for which the remote objects and proxy subclasses were implemented, such as managing remote devices, application programs, etc.

In the described implementations, an IROM and corresponding ROM objects were located on different machines to allow for client-server communication over a network. In alternative implementations, the IROM and corresponding ROM objects may be implemented on the same machine, such that the IROM and ROM objects enable communication between a proxy object and remote object on the same machine. In this way, the network protocol, such as RMI, is used to allow objects to communication with remote objects within a same machine.

In described implementations, the classes were implemented using the Java programming language and the Java RMI communication protocol was used. Additionally, the classes may be implemented in other object oriented programming languages, such as C++, Smalltalk, etc. Further, the ROM and IROM may utilize alternative communication protocols to handle the remote calls, such as SOAP, Common Object Request Broker Architecture (CORBA), Remote Procedure Call (RPC), Distributed Relational Database Architecture (DRDA), etc. In implementations using alternative communication protocols for the remote communications, the IROM and ROM would implement the communication specific related methods.

FIGS. 3a, 3b and 4–7 illustrate specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments. Further, operations described herein may occur sequentially or certain operations may be processed in parallel.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

** Java is a trademark of Sun Microsystems, Inc.

What is claimed is:

1. A method for implementing a remote method call, comprising:
   generating remote objects;
   generating a client communication object; and
   generating a server communication object, wherein the client and server communication objects enable communication between the client and the server communication objects;
   generating at least one proxy object, where each proxy object corresponds to one remote object;
   including data from the remote object into the proxy object; and
   processing a call to a method on one proxy object by:
   (i) determining whether the method is implemented locally;
   (ii) executing a local method including code to perform method operations on the proxy object without going to the remote object, in response to determining that the method is implemented locally; and
   (iii) executing a remote method including code to perform method operations on the remote object, in response to determining that the method is not implemented locally, by:
   (a) passing the remote method to the client communication object;
   (b) transmitting to the server communication object, with the client communication object, an invocation method specifying the remote method on one specified remote object to the server communication object, wherein the server communication object is a first server communication object;
   (c) determining, with the first server communication object, whether the remote object specified in the received invocation method is accessible through a second server communication object; and
   (d) transmitting, with the first server communication object, the received invocation method to the second server communication object to execute against the specified remote object,
   (e) executing, with the second server communication object, the remote method specified in the invocation method ante specified remote object; and
   (f) returning, with the second server communication object, data generated in response to execution of the remote method on the specified remote object to the client communication object.

2. The method of claim 1, wherein executing one local method comprises processing data in the proxy object from the remote object, wherein remote object data is returned to a caller from the proxy object, wherein the remote object data is the data from the remote object included into the proxy object.

3. The method of claim 1, wherein generating the at least one proxy object further comprises:
   transmitting a request to instantiate a proxy object for one specified remote object and a specified proxy class;
   generating the proxy object in response to the request;
   calling an initialization method from the specified proxy class to add data from the specified remote object to the generated proxy object; and
   returning the generated proxy object for use in accessing the remote object.

4. The method of claim 3, wherein the proxy object class is a subclass of a remote object class, wherein the remote objects are instantiated from at least one remote object class, and wherein each remote object class is a subclass of a communication protocol class providing methods and attributes.

5. The method of claim 1, wherein one client communication object is generated for each server communication object to which the client communication object will communicate.

6. The method of claim 1, wherein each client communication object is instantiated from a client communication class and wherein each server communication object is instantiated from a server communication class, wherein the client and server communication classes implement methods from a communication protocol class.

7. The method of claim 6, wherein the communication protocol class comprises a Java Remote Method Invocation (RML) classes.

8. The method of claim 6, wherein the client communication object manages communication with the server communication object for a plurality of proxy objects on which remote methods are invoked to execute on corresponding remote objects.

9. The method of claim 6, wherein the client communication class includes code to handle error exceptions generated from the communication protocol class in response to executing remote methods on the plurality of proxy objects.

10. The method of claim 1, wherein the client communication class includes code to handle exceptions related to communication between the client communication object and the server communication object.

11. The method of claim 1, wherein the remote object and proxy object are implemented in a same computer device, and wherein the local and remote method perform their operations on the same computer device.

12. The method of claim 11, wherein the server comprises a first server and wherein generating the at least one proxy object further comprises:
   receiving, with the first server, a method to instantiate a proxy object for a specified remote object;
   determining, at the first server, whether the specified remote object is on a second server;
   transmitting, with the first server, the method to instantiate the proxy object to the second server for execution thereon if the remote object is located on the second server.

13. The method of claim 12, further comprising:
   returning, with the second server, the instantiated proxy object to the first server to return to the client.

14. The method of claim 1, wherein the remote objects are generated on a server system, wherein the call to the method on one proxy object occurs on a client system, wherein the server and client systems communicate over a network, wherein the local method includes code to perform the method operation on the proxy object on the client without going to the server and the remote method includes code to execute remotely on the server to perform method operations on the remote object on the server.

15. The method of claim 14, wherein the server comprises a first server and wherein the called method comprises a remote method, further comprising:
- transmitting, with the client, information indicating the called remote method and remote object corresponding to the proxy object subject on which the remote method is called;
- receiving, with the first server, the information indicating the remote method and remote object to execute;
- determining, at the first server, whether the indicated remote object is on a second server; and
- transmitting information on the indicated remote method and remote object to a second server for execution thereon if the indicated remote object for execution on the second server.

16. The method of claim 15, further comprising:
- launching, with the client, an applet downloaded from the first server, wherein the applet calls the remote method on the proxy object corresponding to the remote object on the second server, and wherein the applet communicates the information indicating the remote method and remote object to the first server.

17. A system for implementing a remote method call, comprising:
- means for generating remote objects;
- means for generating a client communication object; and
- means for generating a server communication object, wherein the client and server communication objects enable communication between the client and the server communication objects;
- means for generating at least one proxy object, where each proxy object corresponds to one remote object;
- means for including data from the remote object into the proxy object; and
- means for processing a call to a method on one proxy object by:
  (i) determining whether the method is implemented locally;
  (ii) executing a local method including code to perform method operations on the proxy object without going to the remote object in response to determining that the method is implemented locally; and
  (iii) executing a remote method including code to perform method operations on the remote object, in response to determining that the method is not implemented locally, by;
    (a) passing the remote method to the client communication object;
    (b) transmitting to the server communication object, with the client communication object, an invocation method specifying the remote method on one specified remote object to the server communication object, wherein the server communication object is a first server communication object;
    (c) determining, with the first server communication object, whether the remote object specified in the received invocation method is accessible through a second server communication object; and
    (d) transmitting, with the first server communication object, the received invocation method to the second server communication object to execute against the specified remote object,
    (e) executing, with the second server communication object, the remote method specified in the invocation method on the specified remote object; and
    (f) returning, with the second server communication object, data generate in response to execution of the remote method on the specified remote object to the client communication object.

18. The system of claim 17, wherein the means for executing one local method comprises processing data in the proxy object from the remote object, wherein remote object data is returned to a caller from the proxy object, wherein the remote object data is the data from the remote object included into the proxy object.

19. The system of claim 17, wherein the means for generating the at least one proxy object further performs:
- transmitting a request to instantiate a proxy object for one specified remote object and a specified proxy class;
- generating the proxy object in response to the request;
- calling an initialization method from the specified proxy class to add data from the specified remote object to the generated proxy object; and
- returning the generated proxy object for use in accessing the remote object.

20. The system of claim 19, wherein the proxy object class is a subclass of the a remote object class, wherein the remote objects are instantiated from at least one remote object class, and wherein each remote object class is a subclass of a communication protocol class providing methods and attributes.

21. The system of claim 17 wherein one client communication object is generated for each server communication object to which the client communication object will communicate.

22. The system of claim 17, wherein each client communication object is instantiated from a client communication class and wherein each server communication object is instantiated from a server communication class, wherein the client and server communication classes implement methods from a communication protocol class.

23. The system of claim 22, wherein the communication protocol class comprises a Java Remote Method Invocation (RMI) classes.

24. The system of claim 22, wherein the client communication object manages communication with the server communication object for a plurality of proxy objects on which remote methods are invoked to execute on corresponding remote objects.

25. The system of claim 22, wherein the client communication class includes code to handle error exceptions generated from the communication protocol class in response to executing remote methods on the plurality of proxy objects.

26. The system of claim 17, wherein the client communication class includes code to handle exceptions related to communication between the client communication object and the server communication object.

27. The system of claim 17, further comprising:
- a computer device, wherein the remote object and proxy object are implemented on the computer device.

28. The system of claim 17, further comprising:
- a client system;
- a server system;
- a network for enabling communication between the client and server system, wherein the remote objects are generated on the server system, wherein the call to the method on one proxy object occurs on a client system, wherein the local methods include code to perform the method operation on the proxy object on the client system without going to the server system and the remote methods include code to execute remotely on the server to perform method operations on the remote object on the server.

29. An article of manufacture including code for implementing a remote method call, wherein the code causes operations to be performed comprising:
- generating remote objects;
- generating a client communication object; and
- generating a server communication object, wherein the client and server communication object enable communication between the client and the server communication objects;
- generating at least one proxy object, where each proxy object corresponds to one remote object;
- including data from the remote object into the proxy object; and
- processing a call to a method on one proxy object by:
  - (i) determining whether the method is implemented locally;
  - (ii) executing a local method including code to perform method operations on the proxy object without going to the remote object, in response to determining that the method is implemented locally; and
  - (iii) executing a remote method including code to perform method operations on the remote object, in response to determining that the method is not implemented locally, by;
    - (a) passing the remote method to the client communication object;
    - (b) transmitting to the server communication object, with the client communication object, an invocation method specifying the remote method on one specified remote object to the server communication object, wherein the server communication object is a first server communication object;
    - (c) determining, with the first server communication object, whether the remote object specified in the received invocation method is accessible through a second server communication object; and
    - (d) transmitting, with the first server communication object, the received invocation method to the second server communication object to execute against the specified remote object,
    - (e) executing, with the second server communication object, the remote method specified in the invocation method on the specified remote object; and
    - (f) returning, with the second server communication object, data generated in response to execution of the remote method on the specified remote object to the client communication object.

30. The article of manufacture of claim 29, wherein executing one local method comprises processing data in the proxy object from the remote object, wherein remote object data is returned to a caller from the proxy object, wherein the remote object data is the data from the remote object included into the proxy object.

31. The article of manufacture of claim 29, wherein generating the at least one proxy object further comprises:
- transmitting a request to instantiate a proxy object for one specified remote object and a specified proxy class;
- generating the proxy object in response to the request;
- calling an initialization method from the specified proxy class to add data from the specified remote object to the generated proxy object; and
- returning the generated proxy object for use in accessing the remote object.

32. The article of manufacture of claim 31, wherein the proxy object class is a subclass of a remote object class, wherein the remote objects are instantiated from at least one remote object class, and wherein each remote object class is a subclass of a communication protocol class providing methods and attributes.

33. The article of manufacture of claim 29, wherein one client communication object is generated for each server communication object to which the client communication object will communicate.

34. The article of manufacture of claim 29, wherein each client communication object is instantiated from a client communication class and wherein each server communication object is instantiated from a server communication class, wherein the client and server communication classes implement methods from a communication protocol class.

35. The article of manufacture of claim 34, wherein the communication protocol class comprises a Java Remote Method Invocation (RMI) classes.

36. The article of manufacture of claim 34, wherein the client communication object manages communication with the server communication object for a plurality of proxy objects on which remote methods are invoked to execute on corresponding remote objects.

37. The article of manufacture of claim 34, wherein the client communication class includes code to handle error exceptions generated from the communication protocol class in response to executing remote methods on the plurality of proxy objects.

38. The article of manufacture of claim 29, wherein the client communication class includes code to handle exceptions related to communication between the client communication object and the server communication object.

* * * * *

UNITED STATES PATENT AND TRADEMARK OFFICE
CERTIFICATE OF CORRECTION

| | |
|---|---|
| PATENT NO. | : 7,051,341 B2 |
| APPLICATION NO. | : 10/020692 |
| DATED | : May 23, 2006 |
| INVENTOR(S) | : David Alan Burton, Robert Louis Morton and Gary William Steffens |

It is certified that error appears in the above-identified patent and that said Letters Patent is hereby corrected as shown below:

Column 11, line 55, delete "ante" and insert -- on the -- .

Column 12, line 27, delete "(RML)" and insert -- RMI -- .

Column 13, line 67, delete "generate" and insert -- generated -- .

Column 15, line 7, delete "object" and insert -- objects -- .

Signed and Sealed this

Fifth Day of June, 2007

JON W. DUDAS
*Director of the United States Patent and Trademark Office*